US006466010B1

(12) United States Patent
Moerbe

(10) Patent No.: US 6,466,010 B1
(45) Date of Patent: Oct. 15, 2002

(54) DISPLACEMENT TRANSDUCER WITH AT LEAST ONE DETECTOR FOR MAGNETIC POLARITY CHANGES, ESPECIALLY FOR MEASURING DISPLACEMENT OF A BRAKE PEDAL

(75) Inventor: Matthias Moerbe, Ilsfeld-Helfenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/180,360
(22) PCT Filed: Jan. 8, 1998
(86) PCT No.: PCT/DE98/00040
  § 371 (c)(1),
  (2), (4) Date: Nov. 6, 1998
(87) PCT Pub. No.: WO98/57127
  PCT Pub. Date: Dec. 17, 1998

(30) Foreign Application Priority Data

Jun. 10, 1997 (DE) .......................... 197 24 388

(51) Int. Cl.[7] ............................ G01D 5/00; G01D 5/17; G01B 7/14
(52) U.S. Cl. .............................. 324/207.21; 324/207.24
(58) Field of Search .......................... 324/207.24, 207.2, 324/207.21, 251, 252; 33/708, 732, 755, 762, 771

(56) References Cited

U.S. PATENT DOCUMENTS 3,273,001 A * 9/1966 Baermann .................... 324/174

OTHER PUBLICATIONS

"Neue, Alternative Losungen fur Drehzahlsensoren im Kraftfahrzeuge auf Magnetoresistiver Basis", VDI, Report No. 509, pp. 263–268. (no translation).

* cited by examiner

Primary Examiner—Walter E. Snow
(74) Attorney, Agent, or Firm—Michael J. Striker

(57) ABSTRACT

A displacement transducer is described, wherein an absolute value of the displacement of a mechanical component or a displacement change can be detected and a corresponding electric output signal can be generated. The mechanical component (2) is connected with a magnetizable tape (8, 8', 8"), which can be moved in the longitudinal direction past at least one detection device (13, 14). The tape (8, 8', 8") is magnetized in predetermined sections (11) with respectively changing polarity, and the polarity changes are detected when the tape (8, 8', 8") moves in order to generate the electrical output signal.

12 Claims, 4 Drawing Sheets

DISPLACEMENT TRANSDUCER WITH AT LEAST ONE DETECTOR FOR MAGNETIC POLARITY CHANGES, ESPECIALLY FOR MEASURING DISPLACEMENT OF A BRAKE PEDAL

BACKGROUND OF THE INVENTION

1. Field of the Invention

The invention relates to a displacement transducer that generates an electrical output signal depending on an absolute value of a displacement of a mechanical component or on a displacement change measured by it.

2. Prior Art

It Is known to actuate a changeable electrical resistor via a rod drive for measuring the displacement in connection with mechanical devices. An analog electrical signal corresponding to the displacement distance traveled can be generated by the movement of a wiper over a resistance path.

SUMMARY OF THE INVENTION

It is an object of the invention to provide an improved displacement transducer device for measuring an absolute or relative value of a displacement of a mechanical component, such as a brake pedal in a motor vehicle.

According to the invention the displacement transducer for measuring an absolute value of a displacement of a mechanical component or a displacement change of the mechanical component and for generating an electrical output signal according the displacement or the displacement change measured thereby comprises

- a magnetic tape having respective magnetic sections with correspondingly changing magnetic polarity, which is connected to the mechanical component so as to move with the mechanical component; and
- at least one detection device arranged next to the magnetic tape so that the magnetic tape moves past the at least one detection device in a longitudinal direction thereof; wherein the at least one detection device includes means for detecting the respective magnetic polarity changes as the respective magnetic sections move past the at least one detection device and means for generating the electrical output signal according to the magnetic polarity changes.

In a a first aspect in accordance with the invention, a displacement transducer of the species described at the outset is advantageous in that an electrical output signal is generated by means of a magnetic tape, while detecting polarization changes during a movement of the tape. By means of this a contactless displacement measuring device, which has an extremely small structural size, can be realized in a simple manner.

It is also possible to achieve the detection of longer displacement distances traveled by a mechanical component, for example by the brake pedal of a motor vehicle, in an advantageous manner by the employment of a magnetizable tape, whose length can be easily adapted to the employment conditions, which can be moved past a detection device in its longitudinal direction. In the process, the tape can be magnetized, by means of methods known per se, with respectively changing polarities of predetermined sections for the establishment of individual magnets.

In accordance with a preferred embodiment, the tape is provided with individual magnets on both sides of the sections, which can be respectively moved past a detection device. A higher resolution can be obtained by means of the individual magnets, which are respectively located opposite each other on the sides of the tape, being offset by one-half their length. A displacement transducer has been constructed in this way, by means of which an incremental resolution of the displacement of the tape is possible with half the section width.

In an advantageous manner, the tape in accordance with a further embodiment is made from two partial tapes of a magnetizable and vulcanizable permanently elastic material. During production, a support fabric is vulcanized between the partial tapes in such a way that the tape is flexible in the longitudinal direction and reinforced in a direction vertical thereto. In this way the secure guidance and simple winding of the tape, along with an accurate detection of the displacement distance traveled, is assured even under mechanical stresses.

A simple and compact construction of the displacement transducer is possible in that the one, or respectively two detection devices are built into a measuring cell, wherein the tape can be moved directly past these detection devices. For the assured winding of the tape, spirally shaped guide tracks are provided in the measuring cell, into which the tape can be moved. In addition, in a simple manner the displacement transducer can be directly provided with a printed circuit board, which contains an electrical circuit for the evaluation, further processing and, if required, digitizing of the output signal of the detection devices.

It is also possible for the displacement measurement by means of the displacement transducer in accordance with the invention to employ existing techniques for a contactless, high-resolution detection of the changes in a magnetic field. In this case, a so-called AMR (anisotropic magnetoresistive) measuring element, a GMR (giant magnetoresistive) measuring element, or a Hall measuring element are known as detection devices.

By means of example, in an article in VDI [Association of German Engineers] Report No. 509 (VDI, publishers 1984), pages 263 to 268, entitled "Neue, alternative Lösungen für Drehzahlsensoren im Kraftfahrzeug auf magnetoresistiver Basis" [Novel, Alternative Solutions for RPM-Sensors on a Magnetoresistive Basis in Motor Vehicles], it is described how a particularly simple and non-sensitive detection of the angle of rotation of a rotating shaft or of gear wheels can be performed with magnetic sensors as measuring elements. This is possible because the direction of the lines of flux of a permanent magnet placed in the sensor can be changed and detected by a movement of the permanent magnet.

Further advantageous embodiments of the invention are recited in the dependent claims.

BRIEF DESCRIPTION OF THE DRAWING

An exemplary embodiment of the displacement transducer in accordance with the invention will be explained by means of the drawings. In which.

Description of the Exemplary Embodiment

Figure 1:
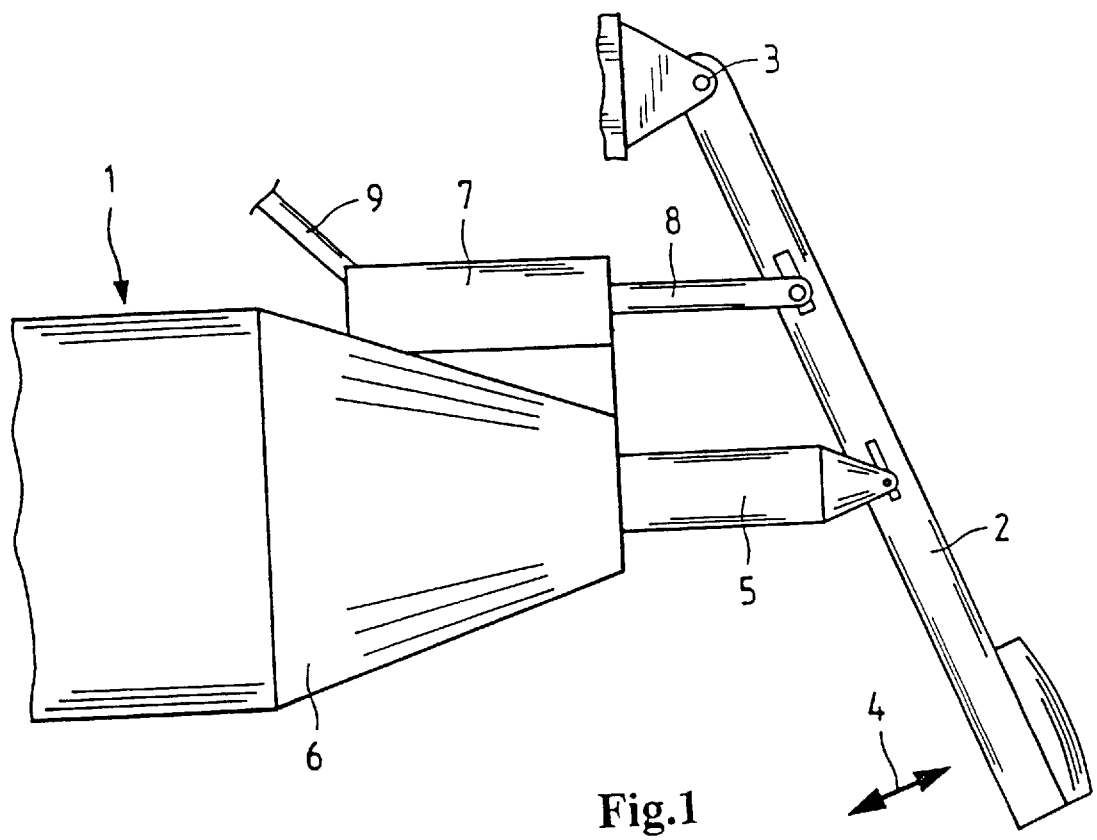
FIG. 1 is a schematic view of a braking device in a motor vehicle with a displacement transducer in a measuring cell.

A braking device 1 for a motor vehicle can be seen in FIG. 1, wherein a brake pedal 2 as a mechanical component is seated at one end 3 and can be displaced at the other end in accordance with the arrow 4. An actuation of the brake pedal 2 leads to a movement of a pressure bar 5, which acts on a downstream connected brake cylinder 6. A measuring cell 7 is arranged on the housing of the brake cylinder 6, into which a tape 8 can be inserted for a displacement measurement proportional to the movement of the pressure bar 5. Thus, an electrical signal proportional to the travel of the pressure bar 5 is therefore available at output connectors 9 of the measuring cell 7 for evaluating and/or further processing.

Figure 2:
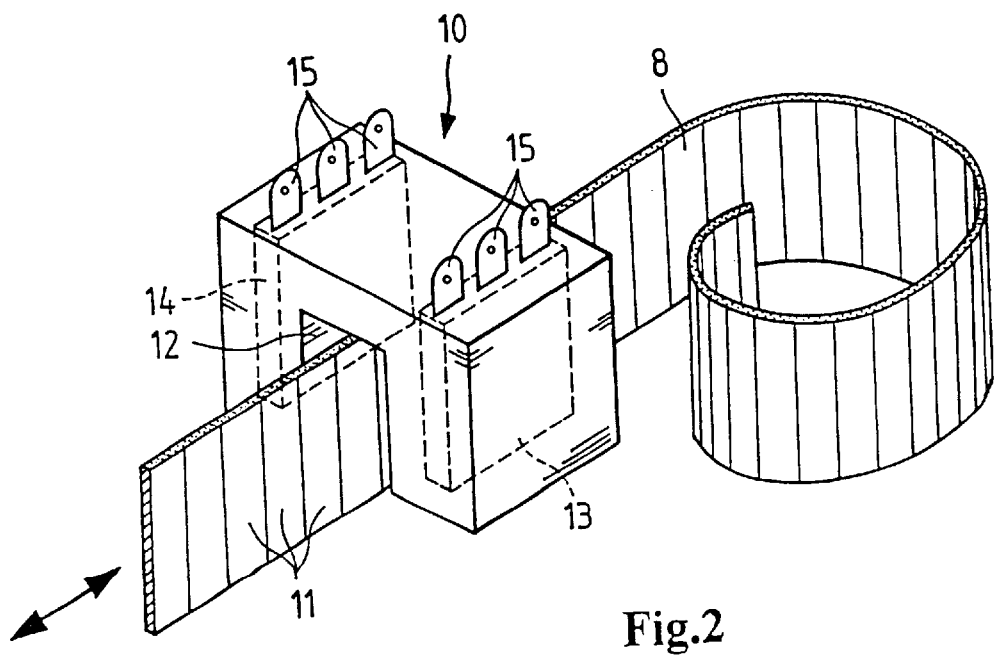
FIG. 2 is a detailed representation of a displacement transducer with a magnetizable tape in the braking device in FIG. 1.

A displacement transducer 10 in accordance with FIG. 2 is housed in the measuring cell 7 in accordance with FIG. 1. In sections 11 the tape 8 has fields, which have been magnetized with changing polarity, which are passed along detection devices 13 and 14 in a recess 12 of the displacement transducer 10. These detection devices 13 and 14 can preferably be so-called AMR (anisotropic magnetoresistive) measuring elements, GMR (giant magnetoresistive) measuring elements, or Hall measuring elements, which have already been mentioned in the preamble to the specification. The output signals of the detection devices can be conducted out via connectors 15.

Figure 3:
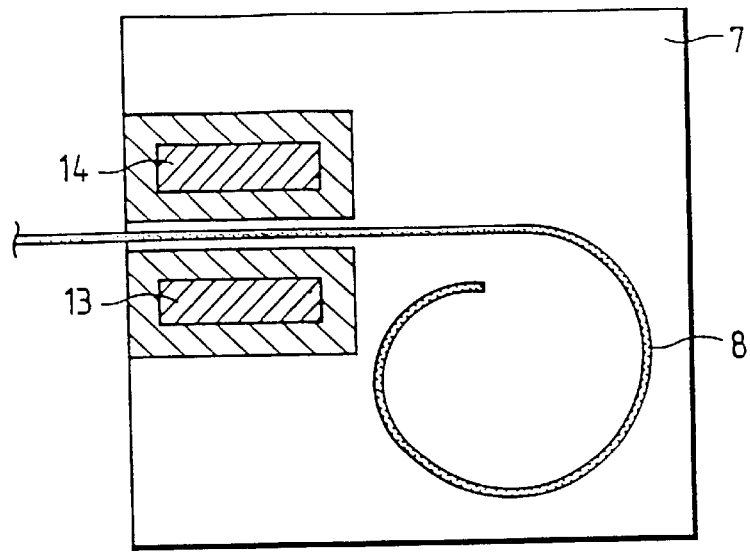
FIG. 3 is a plan view of a measuring cell with the tape in accordance with FIG. 2.
Figure 4:
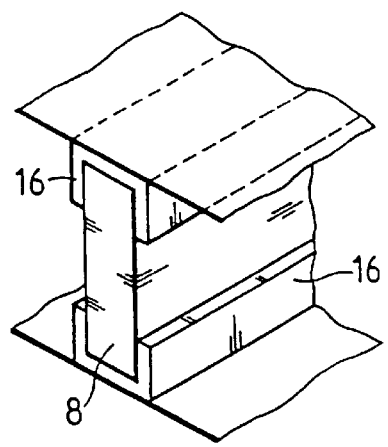
FIG. 4 is a detailed representation of a guide track for the magnetizable tape.

The basic guidance of the tape 8 between the detection devices 13 and 14, as well as the spiral-shaped winding in the measuring cell 7, are represented in the plan view in accordance with FIG. 3. Secure guidance of the tape 8 can be achieved by means of guide tracks 16 in accordance with FIG. 4, which are arranged inside the measuring cell 7.

Figure 5:
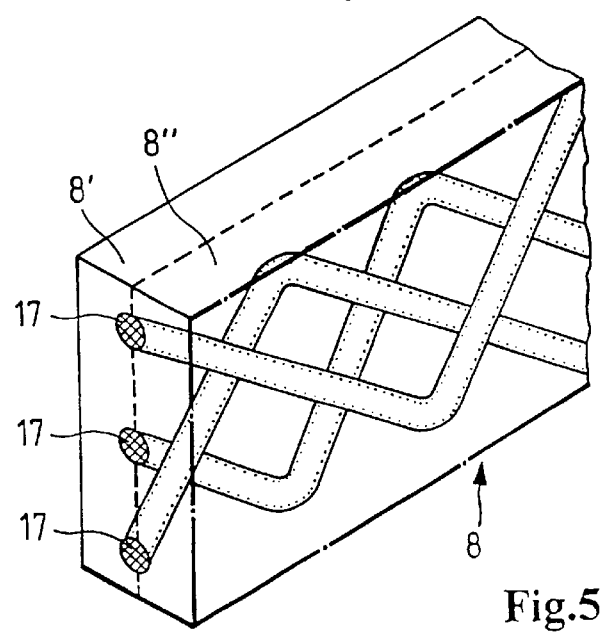
FIG. 5 is a plan view of the tape with a reinforcement fabric.

An embodiment of the tape 8, which can be especially stressed, is explained by means of FIG. 5. The tape 8 is made of a magnetizable and vulcanizable permanently elastic material and is made of two partial tapes 8' and 8", wherein a support fabric 17 is inserted between the partial tapes 8' and 8" when the tape 8 is produced. Here, the support fabric 17 has been vulcanized into the tape 8 in such a way that, because of the support fabric 17, the tape 8 is flexible in the longitudinal direction, i.e. in the movement direction, and reinforced vertically in respect thereto.

Figure 6:
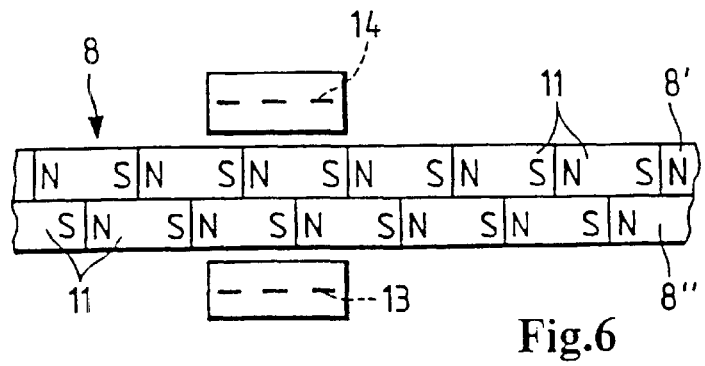
FIG. 6 is a basic diagram of the magnetized sections of the tape.

The sections 11 with partial magnets respectively magnetized in the longitudinal direction can be seen in FIG. 6, which are here offset, respectively by half a section length, in respect to each other in the partial tapes 8' and 8".

Figure 7:
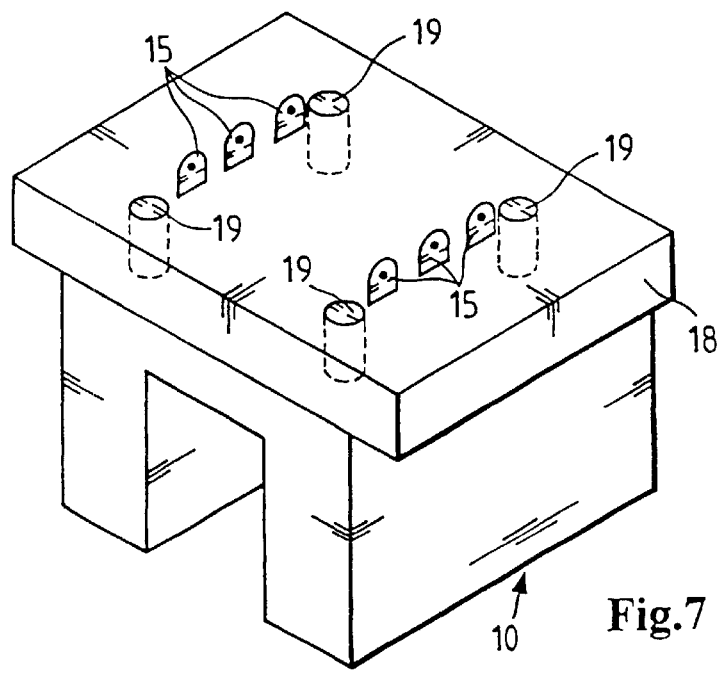
FIG. 7 is a representation of a displacement transducer with a printed circuit board.

On the displacement transducer 10 in accordance with FIG. 7, a printed circuit board 18 with an electric evaluation circuit has been attached to the displacement transducer 10 directly above the detection devices, wherein the connectors 15 are in direct contact with strip conductors, which cannot be seen here in detail. Fastening of the printed circuit board 18 is possible by means of pins 19, extrusion molded on the displacement transducer which, following assembly, can be caulked, for example by thermal compression.

Figure 8:
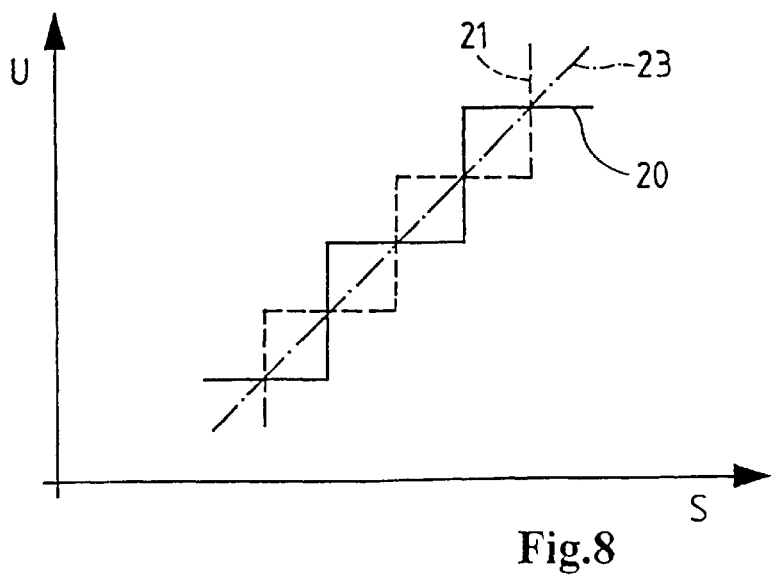
FIG. 8 is a graphical illustration of the voltage at the output of the detection device, as a function of displacement

The paths 20 and 21 of the output voltages U of the detection devices 13 and 14 can be seen in the diagram of FIG. 8. Here, switching processes S result in the course of the passage of the tape 8 as represented in FIG. 6. A switching pulse S is generated each time there is a change of polarization during the passage of the sections 11, wherein the switching pulses of the detection devices 13 and 14 are respectively offset in respect to each other by one half the width of a section, so that a technical measurement resolution of a size of half a section width results.

An evaluation of the output signal of the detection devices 13 and 14 can take place by counting the switching pulses S, from which the absolute value of the displacement path of the tape 8 results. However, it is also possible to perform an analog evaluation of the switching actions S, which supplement each other, so that an approximately linear change of the output signal during a movement of the tape 8 after a progression 23 is achieved.

Figure 9:
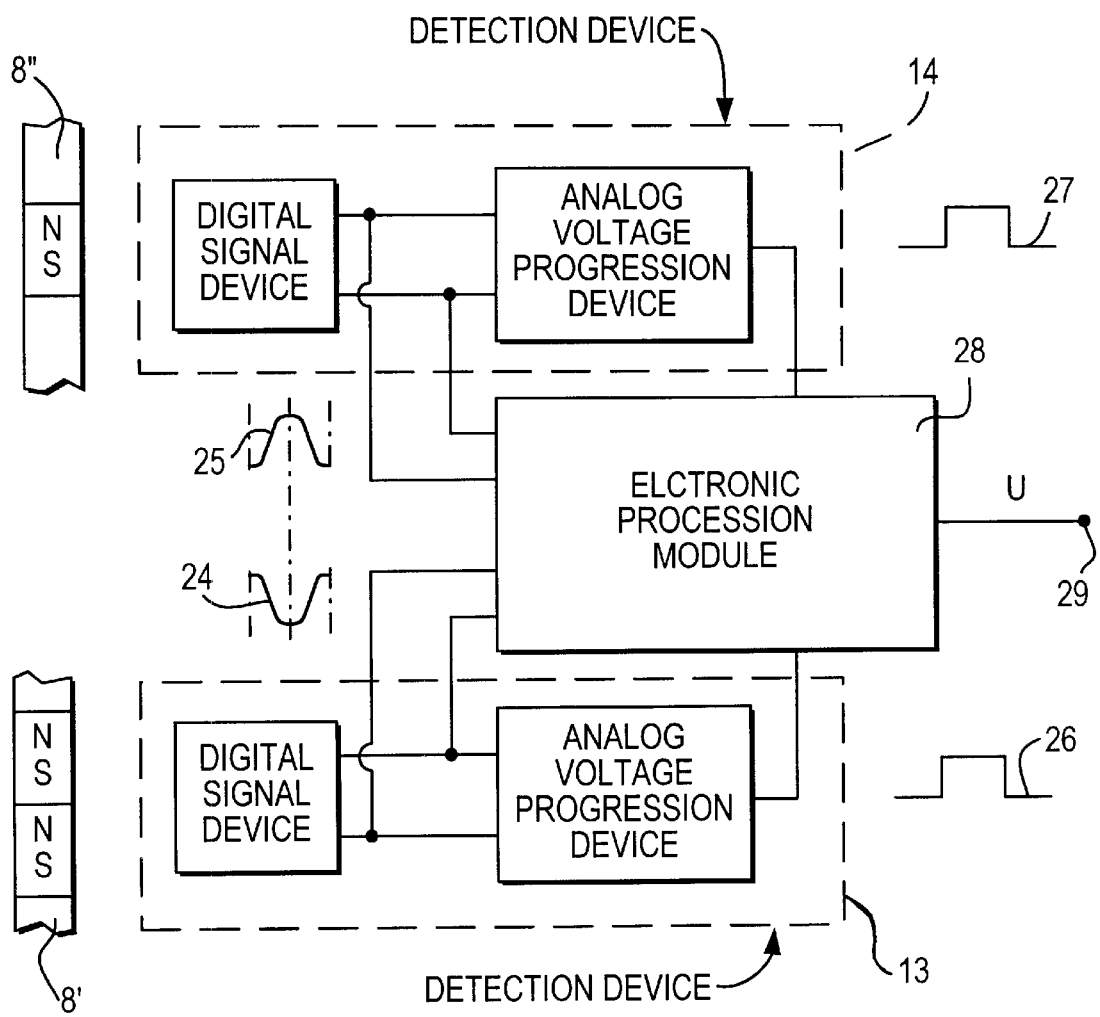
FIG. 9 is a block diagram of an evaluation circuit for the output signals of the detection device.

A possible realization of the evaluation of the switching actions S described by means of FIG. 8 can be performed with a circuit in accordance with FIG. 9. This circuit is put together from conventional electronic components and is intended here to be explained purely in principle by the application to the displacement actuator 10. When constructing the tape 8 with the partial tapes 8' and 8", in accordance with FIG. 6, an analog voltage progression 24 and a digital signal 26 result at the detection device 13; an analog voltage progression 25 and a digital signal 27 result at the detection device 14. The processing of these signals can be performed in an electronic module 28 in such a way, that an output signal U is present at the output 29 which, with the voltage progression 23 in accordance with FIG. 8, changes linearly with the measured displacement distance.

What is claimed is:

1. A displacement transducer for measuring an absolute value of a displacement of a mechanical component (2) or a displacement change of the mechanical component (2) and for generating an electrical output signal according to the displacement or the displacement change, said displacement transducer comprising a magnetic tape (8, 8', 8") having respective magnetic sections (11) with correspondingly changing magnetic polarity, said magnetic tape being connected to the mechanical component (2) so as to move with the mechanical component; and at least one detection device (13, 14) arranged next to said magnetic tape (8, 8', 8") so that said magnetic tape moves past said at least one detection device (13, 14) in a longitudinal direction thereof when said mechanical component (2) moves, said at least one detection device (13, 14) including means for detecting said respective magnetic polarity changes as said respective magnetic sections move past said at least one detection device and means for generating said electrical output signal according to said magnetic polarity changes;

wherein said at least one detection device (13, 14) is an anisotropic or giant magnetoresistive measuring element or is a Hall measuring element.

2. The displacement transducer as defined in claim 1, wherein said respective magnetic sections (11) are provided with corresponding individual magnets and said individual magnets are magnetized in the longitudinal direction of said magnetic tape (8, 8', 8").

3. The displacement transducer as defined in claim 2, wherein said magnetic tape (8, 8', 8") has opposite sides and said individual magnets are provided on both of said opposite sides of said magnetic tape in said magnetic sections (11).

4. A displacement transducer for measuring an absolute value of a displacement of a mechanical component (2) or a displacement change of the mechanical component (2) and for generating an electrical output signal according to the displacement or the displacement change, said displacement transducer comprising a magnetic tape (8, 8', 8") having respective magnetic sections (11) with correspondingly changing magnetic polarity, said magnetic tape being connected to the mechanical component (2) so as to move with the mechanical component; and at least ohe detection device (13, 14) arranged next to said magnetic tape (8, 8', 8") so that said magnetic tape moves past said at least one detection device (13, 14) in a longitudinal direction thereof when said mechanical component (2) moves, said at least one detection device (13, 14) including means for detecting said respective magnetic polarity changes as said respective magnetic sections move past said at least one detection device and means for generating said at least one electrical output signal according to said magnetic polarity changes;

wherein said magnetic tape (8, 8', 8") has opposite sides and said magnetic sections (11) are provided with individual magnets on both of said opposite sides of said magnetic tape, said individual magnets each have a predetermined length and said individual magnets on one of said opposite sides are offset with respect to said individual magnets on another of said opposite sides in the longitudinal direction on said magnetic tape by half of said predetermined length.

5. The displacement transducer as defined in claim 1 or 4, wherein said magnetic tape (8, 8', 8") comprises two partial tapes (8', 8") each consisting of magnetizable vulcanizable permanently elastic material and a support fabric (17) vulcanized between said two partial tapes, so that said magnetic tape (8, 8', 8") is flexible in the longitudinal direction and is reinforced in a direction perpendicular to said longitudinal direction.

6. The displacement transducer as defined in claim 4, further comprising a measuring cell (7) including said at least one detection device (13, 14) and wherein said measuring cell (7) is provided with partially spiral-shaped guide tracks (16) for guiding said magnetic tape (8, 8', 8") through said measuring cell (7) and past said at least one detection device (13, 14).

7. The displacement transducer as defined in claim 1 or 4, further comprising an electrical processing circuit (28) for evaluation and further processing of said electrical output signal from said at least one detection device (13, 14).

8. The displacement transducer as defined in claim 4, wherein said at least one detection device (13, 14) is an anisotropic or giant magnetoresistive measuring element.

9. The displacement transducer as defined in claim 4, wherein said at least one detection device (13, 14) is a Hall measuring element.

10. The displacement transducer as defined in claim 4, wherein said mechanical component (2) is a brake pedal in a braking device of a motor vehicle and one end of said magnetic tape (8, 8', 8") is connected to said brake pedal for measuring position changes of said brake pedal.

11. A displacement transducer for measuring an absolute value of a displacement of a mechanical component (2) or a displacement change of the mechanical component (2) an d for generating an electrical output signal according to the displacement or the displacement change, said displacement transducer comprising a magnetic tape (8, 8', 8") having respective magnetic sections (11) with correspondingly changing magnetic polarity, said magnetic tape being connected to the mechanical component (2) so as to move with the mechanical component;

at least one detection device (13, 14) arranged next to said magnetic tape (8, 8', 8") so that said magnetic tape moves past said at least one detection device (13, 14) in a longitudinal direction thereof when said mechanical component (2) moves, said at least one detection device (13, 14) including means for detecting said respective magnetic polarity changes as said respective magnetic sections move past said at least one detection device and means for generating said electrical output signal according to said magnetic polarity changes; and a measuring cell (7) including said at least one detection device (13, 14) and wherein said measuring cell (7) is provided with partially spiral-shaped guide tracks (16) for guiding said magnetic tape (8, 8', 8") through said measuring cell (7) and past said at least one detection device (13, 14).

12. A displacement transducer for measuring an absolute value of a displacement of a mechanical component (2) or a displacement change of the mechanical component (2) and for generating an electrical output signal according to the displacement or the displacement change, said displacement transducer comprising a magnetic tape (8, 8', 8") having respective magnetic sections (11) with correspondingly changing magnetic polarity, said magnetic tape being connected to the mechanical component (2) so as to move with the mechanical component; and at least one detection device (13, 14) arranged next to said magnetic tape (8, 8', 8") so that said magnetic tape moves past said at least one detection device (13, 14) in a longitudinal direction thereof when said mechanical component (2) moves, said at least one detection device (13, 14) including means for detecting said respective magnetic polarity changes as said respective magnetic sections move past said at least one detection device and means for generating said electrical output signal according to said magnetic polarity changes;

wherein said mechanical component (2) is a brake pedal in a braking device of a motor vehicle and one end of said magnetic tape (8, 8', 8") is connected to said brake pedal for measuring position changes of said brake pedal.

* * * * *